United States Patent
Dierickx

(10) Patent No.: US 7,224,389 B2
(45) Date of Patent: May 29, 2007

(54) METHOD TO ADJUST THE SIGNAL LEVEL OF AN ACTIVE PIXEL AND CORRESPONDING ACTIVE PIXEL

(75) Inventor: Bart Dierickx, Mortsel (BE)

(73) Assignee: Cypress Semiconductor Corporation (Belgium) BVBA, Mechelen (BE)

(*) Notice: Subject to any disclaimer, the term of this patent is extended or adjusted under 35 U.S.C. 154(b) by 829 days.

(21) Appl. No.: 09/906,418

(22) Filed: Jul. 16, 2001

(65) Prior Publication Data
US 2003/0011694 A1 Jan. 16, 2003

(51) Int. Cl.
*H04N 5/335* (2006.01)

(52) U.S. Cl. ........................................ 348/308

(58) Field of Classification Search .............. 348/308, 348/302, 394, 257, 300, 301; 250/208.1
See application file for complete search history.

(56) References Cited

U.S. PATENT DOCUMENTS 5,128,534 A * 7/1992 Wyles et al. ............. 250/208.1
5,461,425 A * 10/1995 Fowler et al. ............. 348/294
5,990,948 A * 11/1999 Sugiki ...................... 348/250
6,166,367 A * 12/2000 Cho ........................ 250/208.1
6,836,291 B1 * 12/2004 Nakamura et al. ......... 348/301

OTHER PUBLICATIONS

Yadid-Pecht, "A random access photodiode array for intelligent image capture", IEEE Transactions of Electron Devices, vol. 38, No. 8, Aug. 1991, p. 1772.

* cited by examiner

*Primary Examiner*—Vivek Srivastava
*Assistant Examiner*—Timothy J. Henn
(74) *Attorney, Agent, or Firm*—Blakely Sokoloff Taylor & Zafman LLP

(57) ABSTRACT

An active pixel comprises a sensor circuit for collecting radiation induced charges and transducing them to a measurement signal corresponding to the amount of charge collected, and a capacitor element with two nodes, where the measurement signal is present on a node of the capacitor element. The memory circuit is clocked, i.e. driven by a pulsed signal. The pulse on the memory circuit will rise the reset level at the output, which is lowered due to threshold voltage losses in the active pixel circuit, thus restoring a large signal swing. Arrays of the pixels are described, as well as a method for reading out such a pixel.

24 Claims, 2 Drawing Sheets

METHOD TO ADJUST THE SIGNAL LEVEL OF AN ACTIVE PIXEL AND CORRESPONDING ACTIVE PIXEL

TECHNICAL FIELD OF THE INVENTION

The present invention relates to a method for adjusting the signal level of an active pixel, and an active pixel wherein the signal level can be adjusted.

Such an active pixel can be used e.g. as an active pixel for synchronous detection. With synchronous detection is meant a technique for sensing the time variation of collected photocharges with synchronous excitation of a sensor element and detection of the photocharges collected thereon.

BACKGROUND OF THE INVENTION

From Orly Yadid-Pecht & al., "A random access photodiode array for intelligent image capture", IEEE transactions on electron devices, vol. 38, no. 8, p.1772 (August, 1991) is known a sensor comprising a light detection unit, an information sampling and holding unit, and a reading unit. The light detection unit comprises a reverse-biased photodiode coupled in series with a reset transistor, which is coupled to a positive power supply. The connection point between the photodiode and the reset transistor is called the photodiode node. This photodiode node is coupled to a sample circuit. The output of the sample circuit is fed to a first terminal of a memory capacitor, of which the second terminal is tied to the ground. The first terminal of the memory capacitor is also connected to a read out circuit.

The processes of sensing and reading out are separated, i.e. the light sensing is periodical but reading can take place at any time. The memory capacitor in the pixel keeps a sampled value for additional readings in the same integration period. In order to enable simple application of multiple readings, buffers are provided. According to a preferred embodiment, a first buffer is placed between the photodiode and the memory capacitor, and a second buffer is placed between the memory capacitor and the reading unit.

This known active pixel has the disadvantage that, due to the presence of several transistors, more specifically the reset transistor, and each of the buffer transistors, there are different MOSFET threshold voltage drops in the circuit, which cause signal attenuation. In view of modern CMOS processes with low power supply voltages (3.3 V, 2.5 V, . . . ), the signal range is thereby greatly reduced. In a 0.5 µm CMOS process, the different threshold voltage drops lower the reset level at the output to about 0.5 V, leaving a difficult to use and not linear signal range of less than 0.5 V.

SUMMARY OF THE INVENTION

It is an object of the present invention to provide a method to overcome signal attenuation in active pixels, as well as to provide an active pixel which does not present the problem of large signal attenuation.

This object is accomplished by introducing a capacitor element with two nodes in an active pixel. Therefore, an active pixel according to the present invention, comprises a sensor circuit for collecting radiation induced charges and transducing them to a measurement signal corresponding to the amount of charge collected, and a capacitor element with two nodes. The pixel's signal is present on a first node of the capacitor element (it may e.g. be stored there), and the signal level is changed by changing the voltage on the other node of the capacitor element. The active pixels may be of various types, e.g. as used for synchronous detection of light. The capacitor element is clocked, i.e. driven by a pulsed signal. The pulse on the capacitor element can raise the reset level at the output by, for instance, about 1 to 2 Volts, thus restoring a large signal swing.

Optionally, the active pixel is also provided with a sample circuit for sampling the measurement signal, which sampled measurement signal is thereafter stored in the capacitor element. The capacitor element may then form part of a sample and hold stage.

The sensor circuit may be adapted to receive various types of radiation, e.g. optical light, IR light, UV light, high energy particles, X-rays, etc. Typically, the sensor circuit comprises a series connection of a reverse-biased photodiode and a reset transistor.

According to a preferred embodiment, the capacitor element may be a simple flat plate capacitor, but it is also possible, and sometimes more compact, to implement it as a MOS structure or a junction. A person skilled in the art may know other capacitor elements which can be used with the present invention.

If the said capacitor element is used as a sample and hold capacitor, furthermore, the pixel may comprise a precharge circuit to pre-charge the voltage on the capacitor element to a starting voltage before the sampling.

Preferably, the active pixel furthermore comprises a read-out circuit connected to the capacitor element, for reading out the measurement signal present or stored on the node of the capacitor element.

The active pixel may furthermore comprise a multiplexer for reading out the signal present or stored on the capacitor element.

A first buffer may be provided between the capacitor element and the read-out circuit; and a second buffer may be provided between the sensor circuit and the sample circuit.

The present invention furthermore describes a method for reading out an active pixel according to the present invention, which method can reduce signal attenuation.

A method according to the present invention for reading out a signal representing a quantity of radiation collected on an active pixel comprising a semiconductor substrate and a read out circuit, comprises the steps of: receiving radiation on the substrate, collecting charges on the substrate generated by the radiation and transducing them to a measurement signal, and transferring the measurement signal present on a first node of a capacitor element to the read-out circuit. Before the measurement signal appears on the first node of the capacitor element, a low voltage pulse is applied to a second node of the capacitor element, and after the appearance of the measurement signal on the first node, but before reading it out, the voltage applied to the second node of the capacitor element is raised.

The measurement signal can be transferred directly to the capacitor element or can be stored on an intermediate capacitor element for example in a sample and hold circuit.

The charges may be stored in a capacitor element such as e.g. a flat plate capacitor, a MOS capacitor or a junction. The radiation may be transduced by a sensor circuit having, for example, a photosensitive element. The incident radiation may be any of optical light, IR light, UV light, high energy particles, X-rays, etc. A sample circuit connected between the sensor circuit and a capacitor element may be used to sample the charge on the sensor circuit. The read-out circuit may be connected to the capacitor element. The capacitor element may be pre-charged before sampling the measurement signal.

The present invention also includes an array of active pixels, each pixel having a sensor circuit for collecting radiation induced charges and transducing them to a measurement signal corresponding to the amount of charge collected, and a capacitor element with two nodes where the measurement signal obtained from the sensor circuit is present on one node of the capacitor element, the array further comprising a pulsing circuit for driving the capacitor element by a pulsed signal.

The array may furthermore comprise a sample circuit for sampling the measurement signal before transferring it to the capacitor element.

It may also comprise a pre-charge circuit to pre-charge a voltage on the capacitor element before the sampling.

Preferably, the array further comprises a circuit for controlling the timing of sampling and pre-charging of all the active pixels of the array at the same time. The capacitor element is clocked, i.e. driven by a pulsed signal. The array may also comprise a read-out circuit connected to the capacitor element(s), for reading out the measurement signal present or stored on the capacitor element(s). A pulse may be applied to the capacitor element which can raise the reset level at the output by, for instance, about 1 to 2 Volts, thus restoring a large signal swing.

The present invention also comprises a method for reading out a signal representing a quantity of radiation incident on active pixels of an array of such pixels, each pixel comprising a semiconductor substrate having a capacitor element and a read out circuit, the method comprising the steps of: receiving radiation on the substrate, collecting charges at different active pixels on the substrate generated by the radiation and transducing them to measurement signals, driving the capacitor elements by a pulsed signal and transferring the measurement signals to the capacitor elements, further comprising the step of driving different capacitor elements by a pulsed signal at the same time.

Preferably, the method furthermore comprises a step of pre-charging the capacitor elements before transferring the measurement signals on the capacitor elements. The method may also comprise a step of sampling the measurement signals before storing them on the capacitor elements.

Preferably, the capacitor elements of all the active pixels of the array are precharged at the same time. The method may also comprise a step of sampling all measurement signals of an array of capacitor elements at the same time.

The capacitor element may e.g. be a flat plate capacitor, a MOS capacitor, or a junction. The radiation may be transduced by a sensor circuit having, for example, a photosensitive element. The incident radiation may be any of optical light, IR light, UV light, high energy particles, X-rays, etc. A sample circuit connected between the sensor circuit and a capacitor element may be used to sample the charge on the sensor circuit. The read-out circuit may be connected to the capacitor element. Before sampling, a low voltage pulse is applied to the capacitor element, and after sampling but before reading out, the voltage applied to the capacitor element is raised.

The present invention also provides a timing circuit for generating any or all of the control signals necessary to implement any of the embodiments of the present invention.

Other features and advantages of the present invention may be seen from the following detailed description of specific embodiments of active pixels for synchronous detection according to the invention. This description is given for the sake of example only, without limiting the scope of the invention. The reference figures quoted below refer to the attached drawings.

DESCRIPTION OF THE ILLUSTRATIVE EMBODIMENTS

The present invention will be described with respect to particular embodiments and with reference to drawings, but the invention is not limited thereto but only by the claims. The drawings described are only schematic and are non-limiting. In the following description it should be understood that all control signals may be provided by a dedicated timing circuit even when this is not explicitly stated.

Figure 1:
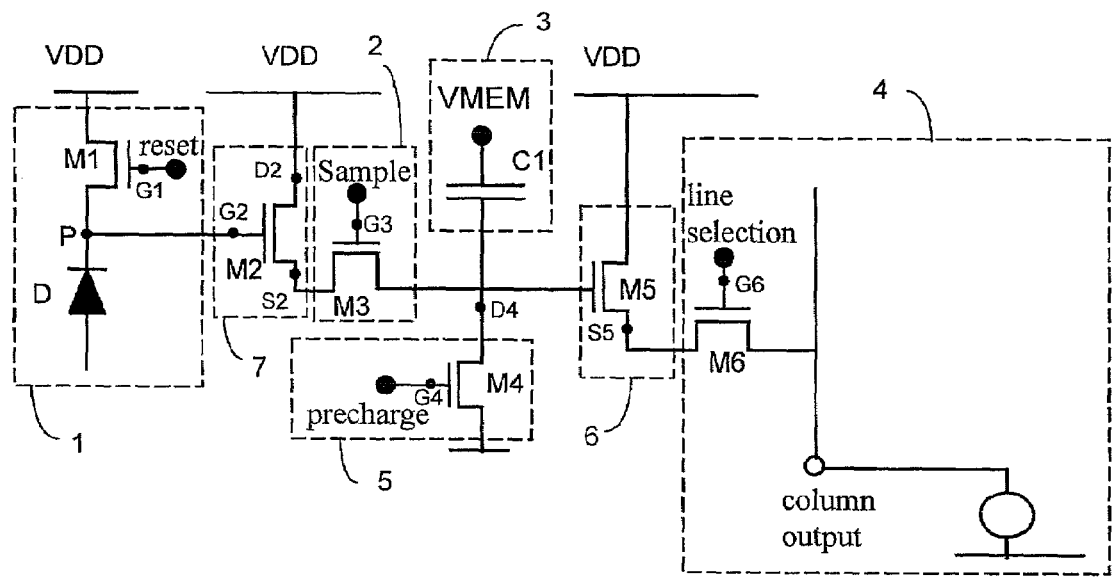
FIG. 1 is a symbol circuit diagram illustrating the electrical circuit of a first embodiment of an active pixel according to the present invention.
Figure 4:
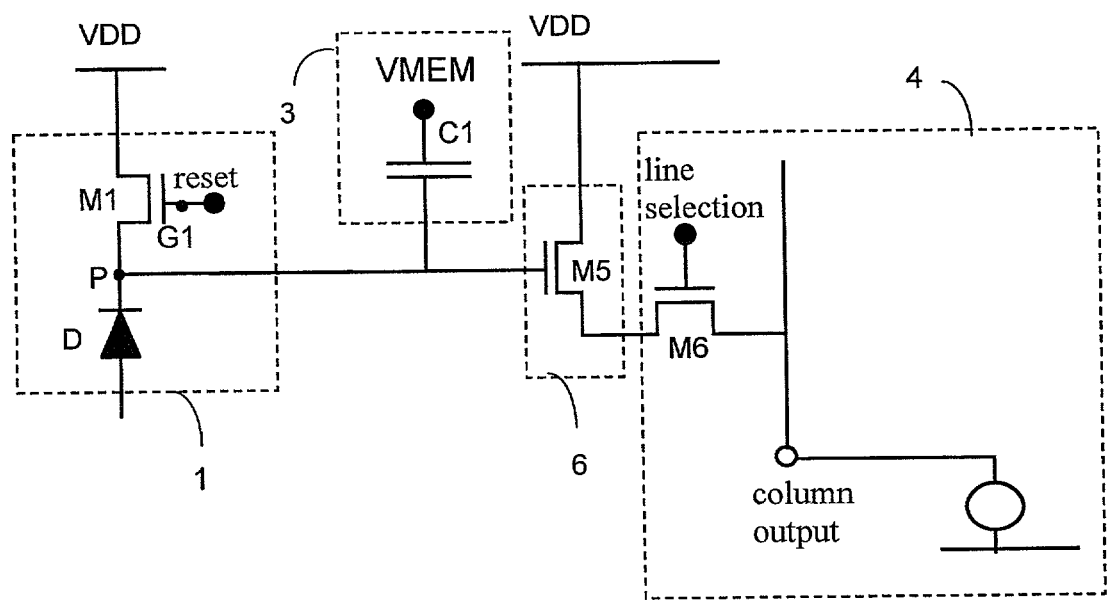
FIG. 4 is a schematic circuit diagram illustrating a most simple embodiment-of an active pixel according to the present invention.

FIGS. 1 and 4 principally depict in schematic form an active pixel according to the present invention, FIG. 4 illustrating the most simple embodiment, and FIG. 1 illustrating a more elaborate embodiment.

The input signal to an active pixel is the radiation intensity at the location of that pixel. The radiation may be any of optical light, IR light, UV light, high energy particles, X-rays, etc. In the following the embodiments of the present invention will be described with reference to incident light. The incident light intensity is transduced by a photodiode (the sensor) and its associated circuits to an analog voltage at the output of the pixel. The sensing is done via a sensor circuit 1, comprising a reverse-biased photodiode D and a reset transistor M1. The photodiode D is reset periodically to a fixed bias by means of reset transistor M1, which is coupled between the reverse-biased photodiode D and a (positive) power supply VDD. Transistor M1 pre-charges the junction capacitance of the photodiode D at the beginning of every integration period when a reset signal is applied to the gate G1 of the reset transistor M1. The photodiode D collects photogenerated charges, e.g. electrons (a semiconductor silicon substrate exposed to photons results in a release of charge carriers) and discharges in proportion to the integration period and the photocurrent of the photodiode D. The current that the photons of the light generate in the photodiode D is related to the incident light directly. For a linear device the current generated is preferably proportional to the light intensity.

The connection between the reset transistor M1 and the photodiode D is the photodiode node P.

In the simple embodiment of FIG. 4, the photodiode node P is directly coupled to a first terminal of a memory circuit 3, comprising a memory capacitor C1. A signal integrated in the photodiode is present on the memory capacitor C1. The signal present on the capacitor C1 can be consequently sensed by a buffer 6, for example comprising buffer transistor M5, and read out in a conventional line-addressing/column readout fashion by the transistor M6. The combination of transistors M5 and M6 is only one possible implementation of a buffer/multiplexer. Many other schemes are possible for that part, and are known to a person skilled in the art.

According to the present invention, the second terminal of the capacitor C1 is clocked by a pulsed signal VMEM, in order to compensate for threshold voltage losses in other parts of the circuit. The pulsed signal VMEM may be provided by a timing circuit.

In the more elaborate embodiment of FIG. 1, the gate G2 of transistor M2 is connected to the photodiode node P, where a voltage signal corresponding to the collected charge on the photodiode D is generated. Transistor M2 acts as a buffer circuit 7. The drain D2 of transistor M2 is connected to the positive power supply VDD, and its source S2 is connected to an input of a sample circuit 2. At the source S2 of buffer transistor M2 appears a voltage that is a measure for the charge on the photodiode node P. After the desired integration period, the signal at source S2 of buffer transistor M2 is sampled by the sample circuit 2, and transferred to the memory circuit 3, comprising a memory capacitor C1 as represented in FIG. 1, connected with a first terminal to the sample circuit 2. Sample circuit 2 and memory circuit 3 together act as a sample and hold stage for the signal at the source S2 of transistor M2. Closing the switch formed by sample transistor M3, by applying a sample signal to the gate G3 of the sample transistor M3, freezes the signal voltage on the capacitor C1. The voltage on the capacitor C1 depends on the transfer function of the sample unit. The sample unit can either be a voltage follower buffer or a switch that transfers some of the charge stored in the photodiode depletion capacitance into the memory capacitor C1. FIG. 1 represents a voltage follower (source follower M2) plus switch (M3). This is a particular implementation of a sample unit, and many other implementations exist. In case of a sample unit comprising a switch, the capacitor C1 should be pre-charged to a starting voltage before the sampling occurs. Pre-charge circuit 5, comprising transistor M4 serves to pre-charge the voltage on the capacitor C1 to a low level upon application of a pre-charge pulse to the gate G4 of this transistor M4, the source of the pre-charge transistor M4 being tied to the ground. The voltage frozen on the capacitor C1 can be consequently sensed by a buffer 6, for example comprising buffer transistor M5, and read out in a conventional line-addressing/column readout fashion by the transistor M6. The combination of transistors M5 and M6 is only one possible implementation of a buffer/multiplexer. Many other schemes are possible for that part, and are known to a person skilled in the art. All control signals necessary to implement the above embodiments may be generated by a dedicated timing circuit.

The reading may occur several times during the sensing of a new value, while the sample and reset switches (respectively transistors M3 and M1) are off. For reading, the line selection switch M6 closes, and the voltage at the source S5 of buffer transistor M5 is transferred to the column bus.

The column output line may end in a current load or a resistive load and will forward the pixel signal to a columns amplifier or another type of amplifier (whereby the type is not relevant for the present invention).

Figure 3:
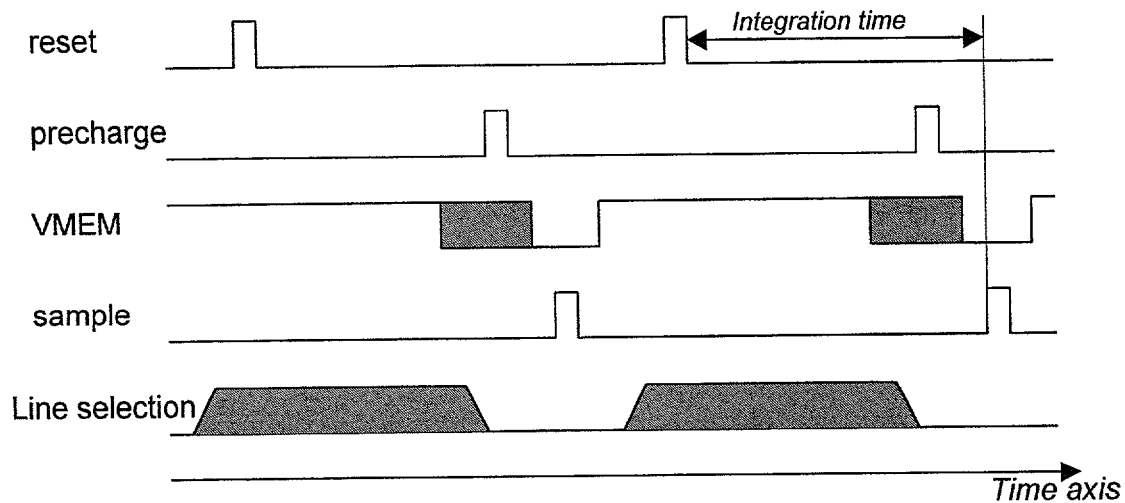
FIG. 3 is a timing chart of the different signals in the electrical circuit of the active pixel of FIG. 1.

In the pixel of FIG. 1, several signals, which are external to the pixel, are applied to the gates of transistors, which act as switches. A timing chart thereof is shown in FIG. 3. A reset signal, applied to the gate G1 of transistor M1 discharges the photodiode node P, in order to start a new integration period. A precharge signal, applied to the gate G4 of the pre-charge transistor M4 pre-charges the memory capacitor C1 to a low level. A pre-charge pulse should occur before a sample switch pulse occurs at the gate G3 of a sample transistor M3. The sample switch pulse charges the memory capacitor C1 to the signal level present at the source S2 of the buffer transistor M2. Opening the sample switch M3 again freezes the signal on the capacitor C1, and is thus effectively the end of the integration time. A line-selection signal applied at the gate G6 of the transistor M6 selects a particular line (or row) of pixels for readout. The line-selection signal can be applied at any moment between two sample pulses. This is illustrated by the hatched zones, which show where a pulse can be.

The pulses reset, sample and precharge may be specific for each pixel individually, or common for rows of pixels. A special case is where these three signals are common for all pixels in an image sensor. As the effective integration time of a pixel is the time between the opening of the reset switch transistor M1 and the opening of the sample and hold switch transistor M3, the time when the pixels "see" can be fixed independently of the moment of readout of the pixels, which is determined by the line-selection signal applied to the readout transistor M6.

Additionally, according to the present invention, also the second terminal of the capacitor C1 is clocked by a pulsed signal VMEM. All the above signals may be provided by a dedicated timing circuit, especially those timing signals shown in or derivable from FIG. 3.

The signal on the gate G2 of transistor M2 is at least a threshold voltage VTH below the positive power supply level VDD of the circuit, or lower. The signal on the source S2 of M2 is another threshold voltage VTH under the signal on the gate G2 of transistor M2, thus least 2 times VTH below the VDD level of the circuit, or lower. Thus also the signal on the drain D4 of pre-charge transistor M4 and on the capacitor C1 is 2 times VTH below VDD, or even lower. Another threshold voltage drop occurs in buffer transistor M5. In view of modern CMOS processes, with low power supply voltages (3.3 V, 2.5 V, . . . ) the signal range is thereby greatly reduced. One way to raise the voltage on the capacitor C1 again, and to therefore compensate for the losses, is as follows. The pulsed signal VMEM applied to the second terminal of capacitor C1 is applied at a low voltage. The first terminal of the capacitor C1 is pre-charged by the pre-charge circuit 5, and subsequently the pixel signal is sampled and held on that node. This signal has at least 2 VTH losses compared to VDD. The sample and hold switch M3 is opened again. Thereafter, the voltage VMEM applied to the second terminal of the capacitor C1 is raised. Consequently the signal on the capacitor C1 will rise along with it. The amplitude of this rise will determine the rise of signal voltage, so that these can be compensated for the VTH losses in the other parts of the circuit. The timing of the VMEM signal is shown in FIG. 3: it may go low before or after the pre-charge pulse (as shown by the hatched zone), but in any case before the sample pulse, and it goes high again after the sample pulse. All the above signals may be provided by a timing circuit.

The same pixel architecture of the present invention can also be used to realise correlated double sampling with an active pixel. Correlated double sampling is a technique of taking two samples of a signal closely spaced in time and subtracting the first signal from the second to remove low-frequency noise. Sampling of the pixel output occurs twice: once after reset and once after integrating the signal charge. The subtraction removes the reset noise (kTC noise) and dc offset from the signal charge.

For correlated double sampling, a pixel needs to be able to yield, just after each other, the reset voltage on a capacitance, and the signal voltage on the same capacitance after it has integrated charge. Consecutive electronic circuitry (which is straightforward for persons skilled in the art) subtracts these two voltages and yields a more offset-free and noise-free result. With the present pixel structure this can be realised as the memory capacitor allows memorising of the reset level on the photodiode. At the moment of readout of the pixels, this reset voltage can be read, and by switching the pre-charge transistor and the sample transistor, the actual signal voltage, possibly also memorised, can be read immediately after it. All necessary control signals can be provided by a timing circuit.

Figure 2:
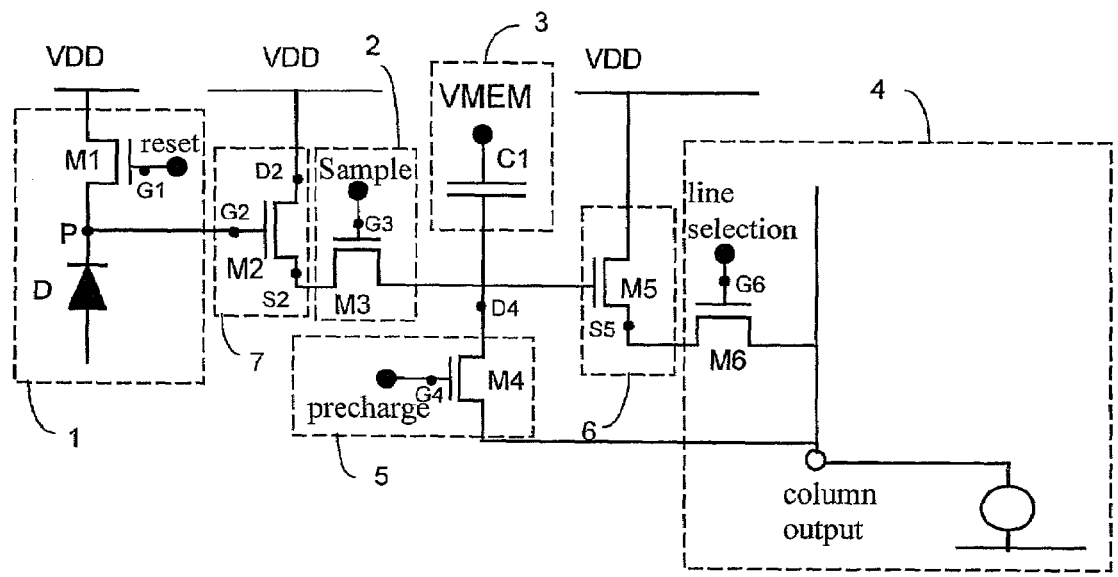
FIG. 2 is a symbol circuit diagram illustrating the electrical circuit of a second embodiment of an active pixel according to the present invention.

FIG. 2 shows a second embodiment of the pixel, where the source S4 of the "precharge" transistor is connected to the column output and not to ground. This saves the use of a ground connection in each pixel, saving silicon area and making the pixel less opaque. Other details of this embodiment are the same as for the first embodiment.

While the invention has been shown and described with reference to preferred embodiments, it will be understood by those skilled in the art that various changes or modifications in form and detail may be made without departing from the scope and spirit of this invention.

What we claim is:

1. An active pixel comprising:
    a sensor circuit for collecting radiation induced charges and for transducing them to a measurement signal corresponding to the amount of charge collected; and
    a capacitor element with two nodes, where the measurement signal is present on a node of the capacitor element, where the measurement signal is changed to a shifted analog signal by changing the voltage on the other node of the capacitor element, and where the shifted analog signal is an output signal.

2. An active pixel according to claim 1, where the measurement signal is stored on a node of the capacitor element.

3. An active pixel according to claim 2, where the capacitor element is part of a sample and hold stage.

4. An active pixel according to claim 1, furthermore comprising a pre-charge circuit to pre-charge the voltage on the node of the capacitor element.

5. An active pixel according to claim 1, furthermore comprising a read-out circuit connected to the capacitor element, for reading out the shifted analog signal present on the node of the capacitor element.

6. An active pixel according to claim 1, furthermore comprising a buffer/multiplexer for reading out the signal present on the node of the capacitor element.

7. An active pixel according to claim 1, wherein the sensor circuit comprises a series connection of a reverse-biased photodiode and a reset transistor.

8. An active pixel according to claim 1, wherein a first buffer is provided between the capacitor element and the read-out circuit.

9. An active pixel according to claim 1, wherein a second buffer is provided between the sensor circuit and a sample circuit.

10. A method for reading out a signal representing a quantity of radiation incident on an active pixel comprising a semiconductor substrate and a read out circuit, the method comprising the steps of:
    receiving radiation on the substrate, collecting charges on the substrate generated by the radiation and transducing them to a measurement signal; and
    transferring the measurement signal present on a first node of a capacitor element to the read-out circuit, the method further comprising the step of, before the measurement signal appears on the first node of the capacitor element, applying a low voltage pulse to a second node of the capacitor element, and after the appearance of the measurement signal on the first node but before reading it out, raising the voltage applied to the second node of the capacitor element so as to shift the measurement signal to a shifted analog signal and to read out the shifted analog signal.

11. A method according to claim 10, whereby the step of transferring includes storing the measurement signal on a first node of the capacitor element.

12. A method according to claim 10, comprising furthermore a step of pre-charging the capacitor element before transferring or storing the measurement signal.

13. A method according to claim 10, wherein a reset level of the pixel is stored, and the moment of readout, this stored reset level and an actual signal level are output briefly after each other, so as to allow subsequent correlated double sampling.

14. An array of active pixels, each active pixel comprising:
    a sensor circuit for collecting radiation induced charges and for transducing them to a measurement signal corresponding to the amount of charge collected; and
    a capacitor element with two nodes where the measurement signal is present on a node of the capacitor element, where the signal level is changed to a shifted analog signal level by changing the voltage on the other node of the capacitor element, and where the shifted analog signal is an output signal.

15. An array according to claim 14, where the measurement signal is stored on a node of the capacitor element.

16. An array according to claim 15, where the capacitor element is part of a sample and hold stage.

17. An array according to claim 14, wherein each active pixel furthermore comprises a pre-charge circuit to pre-charge the voltage on the capacitor element.

18. An array according to claim 14, wherein each active pixel furthermore comprises a read-out circuit connected to the capacitor element, for reading out the shifted analog signal present on the node of the capacitor element.

19. An array according to claim 14, wherein each active pixel furthermore comprises a buffer/multiplexer for reading out the signal present on the memory element.

20. An array according to claim 14, wherein the sensor circuit of each active pixel comprises a series connection of a reverse-biased photodiode and a reset transistor.

21. An array according to claim 14, wherein a first buffer is provided between the capacitor element and the read-out circuit of each active pixel.

22. An array according to claim 14, wherein a second buffer is provided between the sensor circuit and a sample circuit of each active pixel.

23. A method for reading out a signal representing a quantity of radiation incident on active pixels of an array, each pixel comprises a semiconductor substrate having a capacitor element, the method comprising the steps of:
    receiving radiation on the substrate;
    collecting charges at different active pixels on the substrate generated by the radiation and transducing them to measurement signals;
    driving the capacitor elements by a pulsed signal thus shifting the measurement signals to shifted analog signals; and
    storing the measurement signals on the capacitor elements, further comprising the step of driving different capacitor elements by a pulsed signal at the same time.

24. A method according to claim 23, the method further comprising a step of precharging the capacitors of all the active pixels of the array at the same time.

* * * * *